(12) United States Patent
Luo et al.

(10) Patent No.: US 12,499,493 B2
(45) Date of Patent: Dec. 16, 2025

(54) CONTROL APPARATUS, VEHICLE, NON-TRANSITORY COMPUTER READABLE MEDIUM, AND CONTROL METHOD

(71) Applicant: Toyota Jidosha Kabushiki Kaisha, Toyota (JP)

(72) Inventors: Changyi Luo, Kokubunji (JP); Ayana Takeshita, Kasugai (JP); Yuhei Suzuki, Kariya (JP); Michael C. Edwards, McKinney, TX (US); Chris Risberg, Flower Mound, TX (US)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 877 days.

(21) Appl. No.: 17/395,026

(22) Filed: Aug. 5, 2021

(65) Prior Publication Data

US 2022/0043941 A1 Feb. 10, 2022

(30) Foreign Application Priority Data

Aug. 7, 2020 (JP) ................. 2020-135358

(51) Int. Cl.
*G05B 19/418* (2006.01)
*G06Q 50/04* (2012.01)
*G06Q 50/10* (2012.01)
*G06Q 10/08* (2024.01)

(52) U.S. Cl.
CPC ........... *G06Q 50/04* (2013.01); *G05B 19/418* (2013.01); *G06Q 50/10* (2013.01); *G05B 19/4189* (2013.01); *G06Q 10/08* (2013.01)

(58) Field of Classification Search
CPC ...... G06F 3/1292; G06F 3/1204; G06F 3/126; G06F 3/1285; G06F 2113/10; G06Q 10/08355; G06Q 50/04; G06Q 10/06315; B33Y 30/00; B33Y 50/00; G05B 2219/49023; G05B 19/4183; G05B 19/41865
See application file for complete search history.

(56) References Cited

U.S. PATENT DOCUMENTS

| | | | |
|---|---|---|---|
| 9,689,680 B2 * | 6/2017 | Jamain | G01C 21/26 |
| 9,827,714 B1 * | 11/2017 | Ruxton | G06F 3/1285 |
| 10,394,050 B2 * | 8/2019 | Rasschaert | B33Y 10/00 |
| 11,379,896 B2 * | 7/2022 | Ishiwata | G06Q 30/0601 |
| 2008/0005055 A1 * | 1/2008 | Horvitz | G06Q 10/04 |
| | | | 706/62 |

(Continued)

FOREIGN PATENT DOCUMENTS

| | | | |
|---|---|---|---|
| JP | 2017-500635 A | | 1/2017 |
| JP | 2019075047 A | | 5/2019 |

(Continued)

*Primary Examiner* — Darrin D Dunn
(74) *Attorney, Agent, or Firm* — Dinsmore & Shohl LLP (57) ABSTRACT

A control apparatus is communicably connected to a vehicle and a user terminal, the control apparatus including a controller configured to: in response to a service request from the user terminal, determine at least a service content, a provision time, and a provision location; identify a vehicle capable of performing the service content; cause the vehicle to perform the service content inside the vehicle by the provision time; and cause the vehicle to move to the provision location by the provision time.

18 Claims, 8 Drawing Sheets

(56) References Cited

U.S. PATENT DOCUMENTS

| | | | | |
|---|---|---|---|---|
| 2013/0046632 A1* | 2/2013 | Grigg | | G06Q 30/02 |
| | | | | 705/14.58 |
| 2014/0279200 A1* | 9/2014 | Hosein | | G06Q 30/0601 |
| | | | | 705/26.7 |
| 2015/0061166 A1* | 3/2015 | Van De Vrie | | B29C 64/112 |
| | | | | 264/1.7 |
| 2015/0178778 A1* | 6/2015 | Lee | | G06Q 30/0261 |
| | | | | 705/14.58 |
| 2015/0186977 A1* | 7/2015 | Leonard | | G06Q 30/0613 |
| | | | | 705/26.7 |
| 2015/0356665 A1* | 12/2015 | Colson | | G06Q 30/0635 |
| | | | | 705/26.81 |
| 2016/0093003 A1* | 3/2016 | Blatstein | | G06Q 30/0603 |
| | | | | 705/15 |
| 2016/0116904 A1* | 4/2016 | Jensen | | B33Y 30/00 |
| | | | | 700/118 |
| 2016/0180288 A1* | 6/2016 | Sager | | G06Q 10/0836 |
| | | | | 705/333 |
| 2016/0236419 A1* | 8/2016 | Griffin | | B29C 64/147 |
| 2017/0352004 A1* | 12/2017 | McHale | | G01C 21/3415 |
| 2018/0129638 A1* | 5/2018 | Lee | | G06F 3/0488 |
| 2019/0072932 A1* | 3/2019 | Sitnikov | | B29C 64/147 |
| 2019/0195633 A1* | 6/2019 | Matsuoka | | G01C 21/206 |
| 2019/0236534 A1* | 8/2019 | Kaneko | | G05D 1/0274 |
| 2019/0369418 A1* | 12/2019 | Joy | | G06T 19/00 |
| 2020/0019158 A1* | 1/2020 | Kang | | G08G 1/202 |
| 2020/0207040 A1* | 7/2020 | Blank | | B29C 73/26 |
| 2020/0234238 A1 | 7/2020 | Dogishi et al. | | |
| 2020/0311851 A1 | 10/2020 | Ikeda et al. | | |
| 2022/0108042 A1* | 4/2022 | Bowen | | G06T 11/001 |

FOREIGN PATENT DOCUMENTS

| | | |
|---|---|---|
| JP | 2020-119222 A | 8/2020 |
| WO | 2015/070178 A1 | 5/2015 |
| WO | 2019/123620 A1 | 6/2019 |

\* cited by examiner

| REQUEST ID | SERVICE CONTENT | PROVISION TIME | PROVISION LOCATION |
|---|---|---|---|
| R01 | PRINTING OF DOCUMENT | 9:00, APRIL 1, 2021 | OFFICE |
| ⋮ | ⋮ | ⋮ | ⋮ |

FIG. 6

| VEHICLE ID | SERVICE CONTENT TO BE PERFORMED |
|---|---|
| V01 | PRINT DOCUMENT BY PRINTER |
| V02 | CREATE ARTICLE BY 3D PRINTER |
| ⋮ | ⋮ |

| USER ID | DESTINATION | NEED | TIME SLOT |
|---|---|---|---|
| U01 | BEACH | NULL | 10:00-15:00, MAY 1 |
| U02 | MANUFACTURING FACILITY | REPAIR | 9:00-17:00, JUNE 1 |
| ⋮ | ⋮ | ⋮ | ⋮ |

CONTROL APPARATUS, VEHICLE, NON-TRANSITORY COMPUTER READABLE MEDIUM, AND CONTROL METHOD

CROSS-REFERENCE TO RELATED APPLICATION

This application claims priority to Japanese Patent Application No. 2020-135358, filed on Aug. 7, 2020, the entire contents of which are incorporated herein by reference.

TECHNICAL FIELD

The present disclosure relates to a control apparatus, a vehicle, a program, and a control method.

BACKGROUND

Conventionally, there has been known technology for dispatching a vehicle including an indoor space available for a user's private application according to demand (for example, Patent Document [PTL] 1).

CITATION LIST

Patent Literature

PTL 1: JP 2019-075047 A

SUMMARY

PTL 1 assumes that a user boards the vehicle that has arrived and uses the space to do the work. The vehicle does not do the work on behalf of the user.

It would be helpful to provide a control apparatus, a vehicle, a program, and a control method, which are capable doing work requested by a user on behalf of the user, to thereby improve convenience for the user.

A control apparatus according to an embodiment of the present disclosure is a control apparatus that is communicably connected to a vehicle and a user terminal, the control apparatus including a controller configured to:
 in response to a service request from the user terminal, determine at least a service content, a provision time, and a provision location;
 identify a vehicle capable of performing the service content;
 cause the vehicle to perform the service content inside the vehicle by the provision time; and
 cause the vehicle to move to the provision location by the provision time.

A program according to an embodiment of the present disclosure is configured to cause a computer as a control apparatus that is communicably connected to a vehicle and a user terminal, to execute operations including:
 in response to a service request from the user terminal, determining at least a service content, a provision time, and a provision location;
 identifying a vehicle capable of performing the service content;
 causing the vehicle to perform the service content inside the vehicle by the provision time; and
 causing the vehicle to move to the provision location by the provision time.

A control method according to an embodiment of the present disclosure is a control method by a control apparatus that is communicably connected to a vehicle and a user terminal, the control method including:
 in response to a service request from the user terminal, determining at least a service content, a provision time, and a provision location;
 identifying a vehicle capable of performing the service content;
 causing the vehicle to perform the service content inside the vehicle by the provision time; and
 causing the vehicle to move to the provision location by the provision time.

A control apparatus, a vehicle, a program, and a control method according to an embodiment of the present disclosure are capable of doing work requested by a user on behalf of the user, to thereby improve convenience for the user.

BRIEF DESCRIPTION OF THE DRAWINGS

In the accompanying drawings.

DETAILED DESCRIPTION

Figure 1:
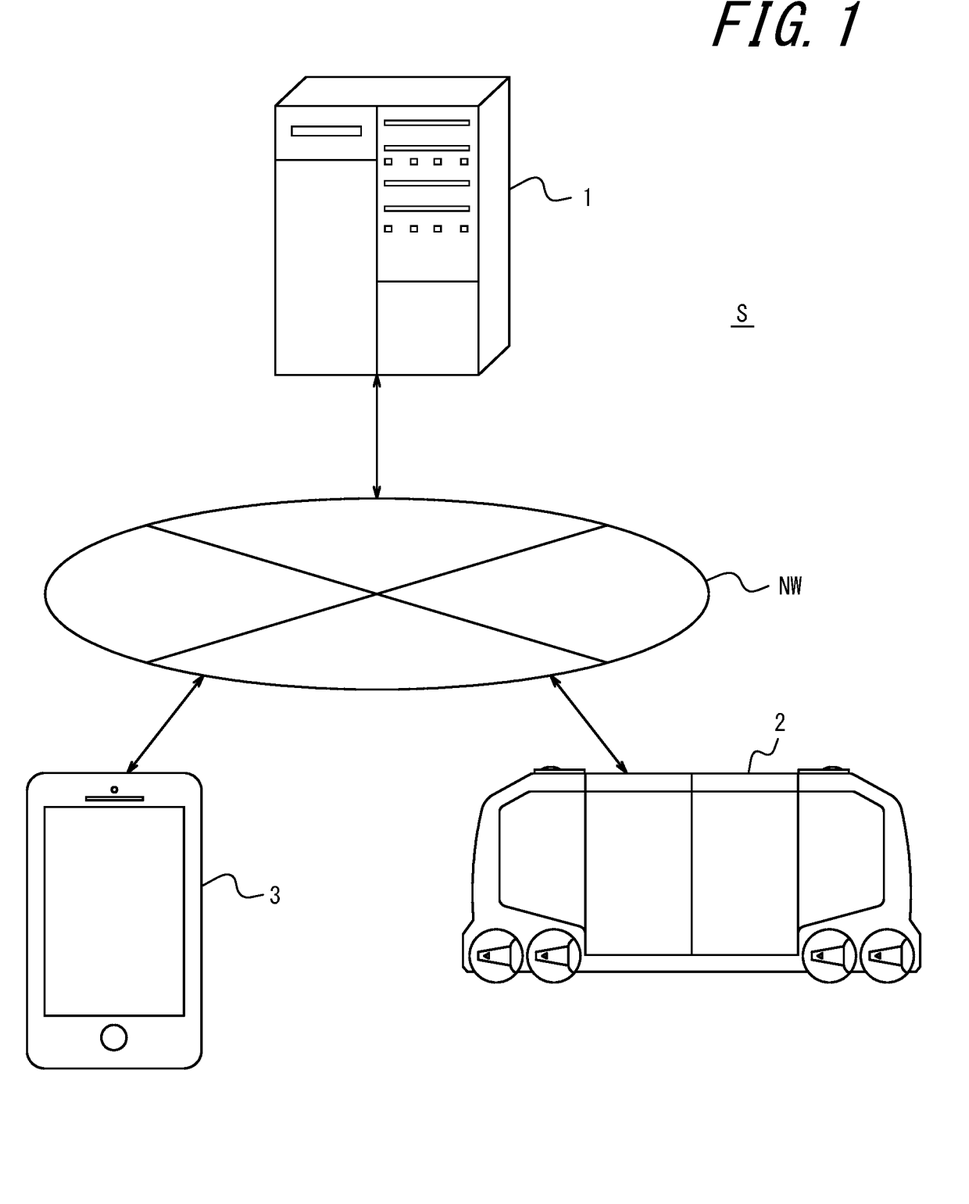
FIG. 1 is a schematic diagram of an information processing system.

FIG. 1 is a schematic diagram of an information processing system S according to an embodiment of the present disclosure. The information processing system S includes a control apparatus 1, a vehicle 2, and a user terminal 3, which are communicably connected to one another. FIG. 1 illustrates one each of the control apparatus 1, the vehicle 2, and the user terminal 3 for convenience of explanation. However, the number of the control apparatus 1, the number of the vehicle 2, and the number of the user terminal 3 are not limited to one each. The control apparatus 1, the vehicle 2, and the user terminal 3 are connected via a network NW including, for example, a mobile communication network and the Internet.

The control apparatus 1 may be a server configured to assist a vehicle dispatch service provider in providing the service. The control apparatus 1 may be, for example, installed in a facility dedicated to a vehicle dispatch provider or in a shared facility including a data center. The control apparatus 1 transmits an instruction to the vehicle 2, to thereby control the vehicle 2. Alternatively, the control apparatus 1 may be mounted in the vehicle 2.

The vehicle 2 includes, for example, any type of automobile such as a gasoline vehicle, a diesel vehicle, an HV, a PHV, an EV, or an FCV. The term "HV" is an abbreviation of Hybrid Vehicle. The term "PHV" is an abbreviation of Plug-in Hybrid Vehicle. The term "EV" is an abbreviation of Electric Vehicle. The term "FCV" is an abbreviation of Fuel Cell Vehicle. The driving of the vehicle 2 is automated at any level in the present embodiment; however, the vehicle 2 may be driven by a driver in another embodiment. The level of automation is, for example, one of Level 1 to Level 5 in the level classification defined of the SAE. The name "SAE" is an abbreviation of Society of Automotive Engineers. The vehicle 2 may be a MaaS-dedicated vehicle. The term "MaaS" is an abbreviation of Mobility as a Service.

The user terminal 3 is a terminal possessed by a user. The user terminal 3 may be, for example, a mobile device including a mobile phone, a smartphone, or a tablet.

An outline of processing to be executed by the control apparatus 1 according to the present embodiment will be described. By way of example, the present embodiment assumes a situation in which a user on the road has realized having forgotten to bring something such as a document, and requests from the vehicle 2 a service of printing and delivering of the document. Specifically, in response to a service request from the user terminal 3, the control apparatus 1 determines at least a service content, a provision time, and a provision location. The control apparatus 1 identifies a vehicle 2 capable of performing the service content, and controls the vehicle 2 to perform the service content inside the vehicle 2 by the provision time. Further, the control apparatus 1 controls the vehicle 2 to move to the provision location by the provision time. This configuration enables the control apparatus 1 to cause the vehicle 2 to perform the service content requested by the user on behalf of the user, to thereby reduce such burden as a workload or a moving load to be imposed on the user and thus improve convenience.

Figure 2:
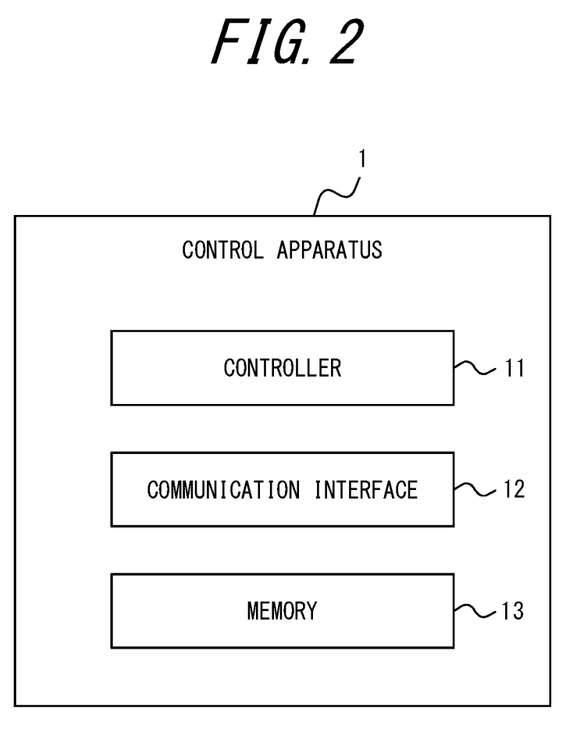
FIG. 2 is a block diagram illustrating a configuration of a control apparatus.

With reference to FIG. 2, an internal configuration of the control apparatus 1 will be described in detail.

The control apparatus 1 includes a controller 11, a communication interface 12, and a memory 13. The components of the control apparatus 1 are communicably connected to one another via, for example, dedicated lines.

The controller 11 includes, for example, at least one general purpose processor including a Central Processing Unit (CPU) or a Micro Processing Unit (MPU). The controller 11 may include at least one dedicated processor that is dedicated to specific processing. The controller 11 may include at least one dedicated circuit instead of a processor. Examples of the dedicated circuit may include a Field-Programmable Gate Array (FPGA) and an Application Specific Integrated Circuit (ASIC).

The communication interface 12 includes at least one communication module for connecting to the network NW, the communication module being compliant with wired or wireless local area network (LAN) standard. The communication interface 12 may include at least one module compliant with a mobile communication standard including the 4th Generation (4G) standard or the 5th Generation (5G) standard. The communication interface 12 may include at least one communication module or the like compliant with a short-range wireless communication standard or specification, including Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 is configured to transmit and receive any information via the network NW. This information includes, for example, positional information acquired through Global Positioning System (GPS).

The memory 13 is, for example, a semiconductor memory, a magnetic memory, or an optical memory, but is not limited thereto. The memory 13 may function as, for example, a main memory, an auxiliary memory, or a cache memory. The memory 13 may store information resulting from analysis or processing performed by the controller 11. The memory 13 may store various types of information or the like related to the operations or control of the control apparatus 1. The memory 13 may store a system program, an application program, embedded software, or the like. The memory 13 includes a request DB, a schedule DB, and a vehicle DB. Alternatively, the request DB, the schedule DB and the vehicle DB may be stored in a storage device external to the control apparatus 1 and accessed by the control apparatus 1.

Figure 3:
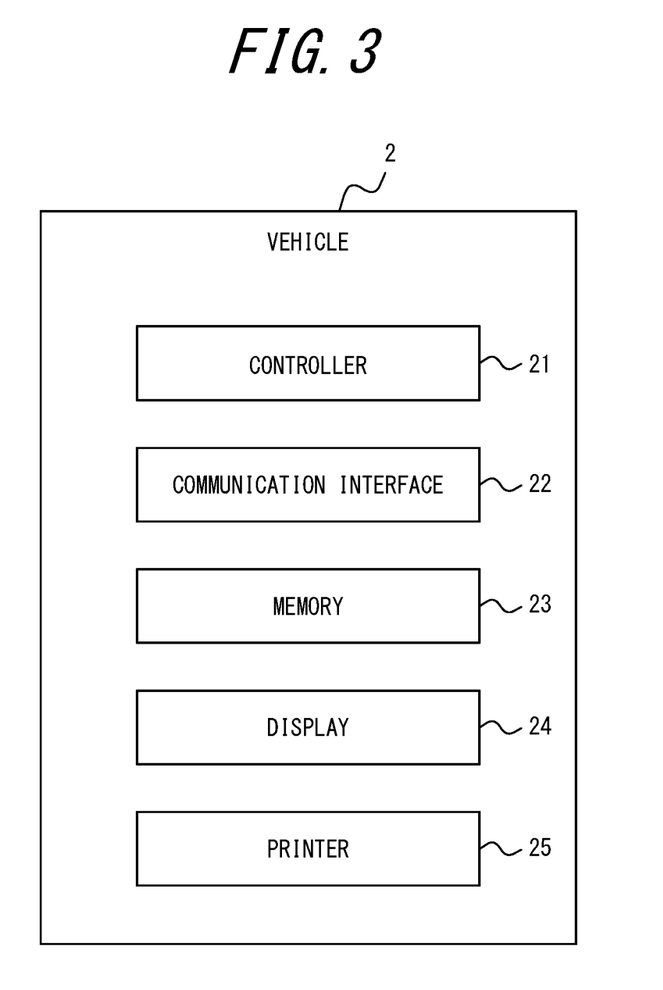
FIG. 3 is a block diagram illustrating a configuration of a vehicle.

With reference to FIG. 3, an internal configuration of the vehicle 2 will be described in detail.

The vehicle 2 includes a controller 21, a communication interface 22, a memory 23, a display 24, and a printer 25. The components of the vehicle 2 are communicably connected to one another via, for example, a dedicated line.

In the present embodiment, the hardware configurations of the controller 21, the communication interface 22, and the memory 23 are the same as the hardware configurations of the controller 11, the communication interface 12, and the memory 13 of the control apparatus 1. Therefore, a description thereof is omitted here.

The display 24 is an interface for display, and includes, for example, a panel display. The display 24 may display information read out from the memory 23, or information generated by the controller 21.

The printer 25 is a device for use in printing. The printer 25 can two-dimensionally print a symbol, a letter, or the like on paper. Alternatively, the printer 25 may be a so-called 3D printer for three-dimensionally shaping a solid body.

Figure 4:
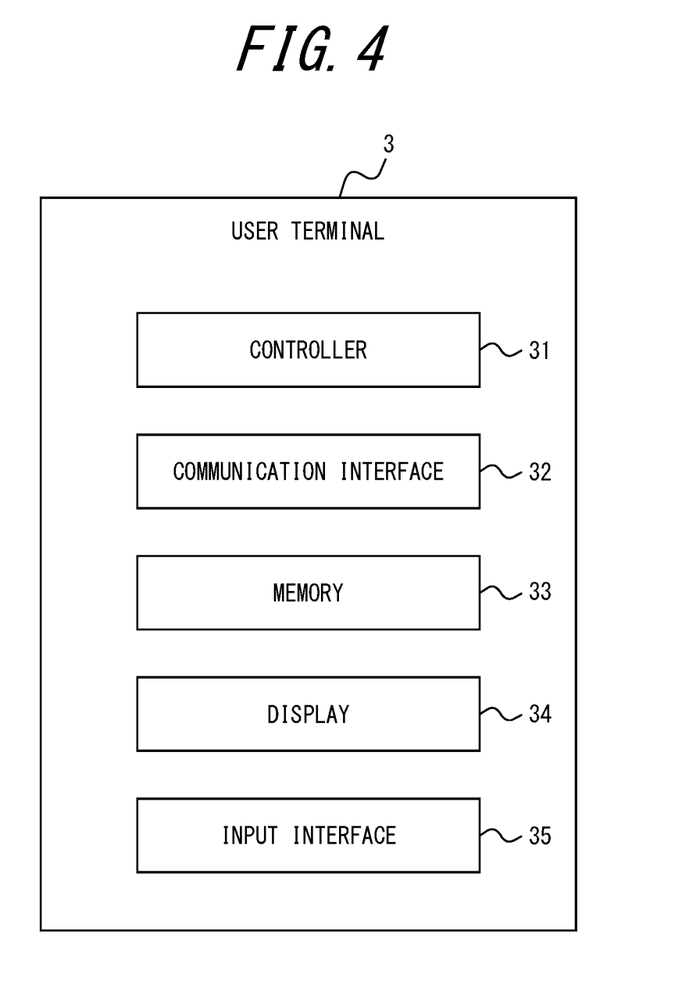
FIG. 4 is a block diagram illustrating a configuration of a user terminal.

With reference to FIG. 4, an internal configuration of the user terminal 3 will be described in detail.

The user terminal 3 includes a controller 31, a communication interface 32, a memory 33, a display 34, and an input interface 35. The components of the user terminal 3 are communicably connected to one another, for example, via a dedicated line.

The hardware configurations of the controller 31, the communication interface 32, the memory 33, and the display 34 are the same as the hardware configurations of the controller 21, the communication interface 22, the memory 23, and the display 24 of the vehicle 2. Therefore, a description thereof is omitted here.

The input interface 35 includes one or more interfaces for input that detect a user input and send input information to the controller 31. Examples of the interface for input may include, but are not limited to, a physical key, a capacitive key, a touch screen integrally provided in the panel display, a microphone configured to receive audio input, and an IC card reader.

Hereinafter, processing to be executed in the information processing system S according to the present embodiment will be described in detail. A situation will be described herein, by way of example, in which a user, who is on the way to the office, has realized having forgotten to bring a document.

The user operates the user terminal 3 to input service information in order to have the document printed and delivered. The service information includes information on a service content, a provision time, and a provision location. The service content is the content of the service desired by the user. The provision time is the time by which the service is provided. The provision location is the location where a service is provided. Upon receiving the input of the service information, the user terminal 3 transmits a service request including the service information to the control apparatus 1.

Figure 5:
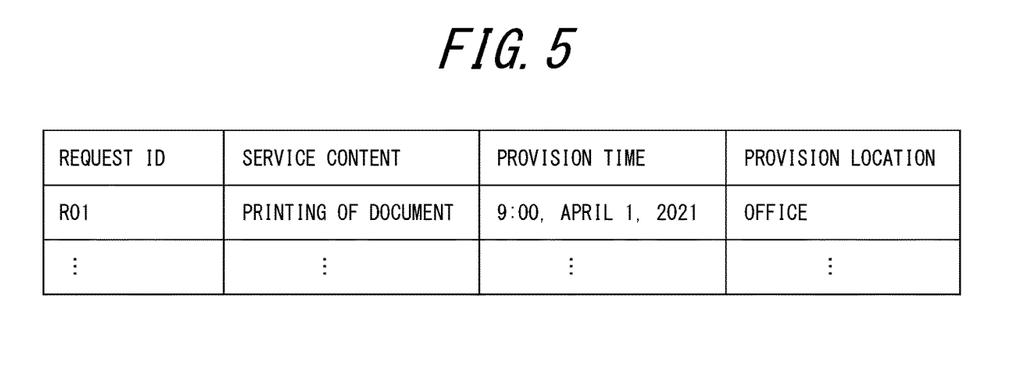
FIG. 5 is a diagram illustrating a data structure of a request database (DB)

Upon receiving the service request, the control apparatus 1 stores the service information in the request DB in the memory 13, as illustrated in FIG. 5. Here, the service content is printing of a document. The provision time is 9:00 on April 1. The provision location is an office. That is, it is required that printing of a document be performed inside the vehicle 2 and the document be delivered to the office by 9:00 on April 1. The control apparatus 1 determines each content of the service information, based on the request DB.

Figure 6:
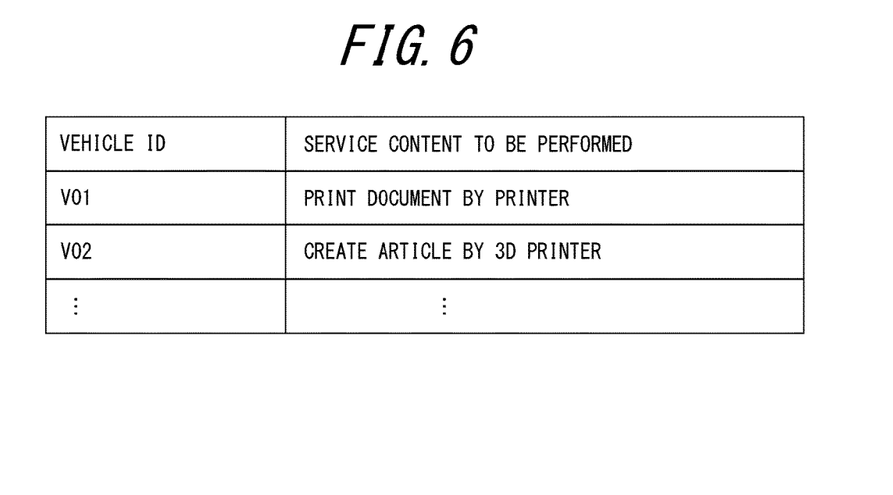
FIG. 6 is a diagram illustrating a data structure of a vehicle DB.

The control apparatus 1 identifies a vehicle 2 capable of performing the determined service content. Specifically, the control apparatus 1 refers to the vehicle DB of FIG. 6 to identify a vehicle capable of performing printing of a document. In the vehicle DB, service contents are each stored in association with each of one or more vehicles that can perform the service content. Here, a vehicle with the vehicle ID of V01 is identified as the vehicle 2 capable of performing the "printing of a document", which is the service content input by the user terminal 3.

Figure 7:
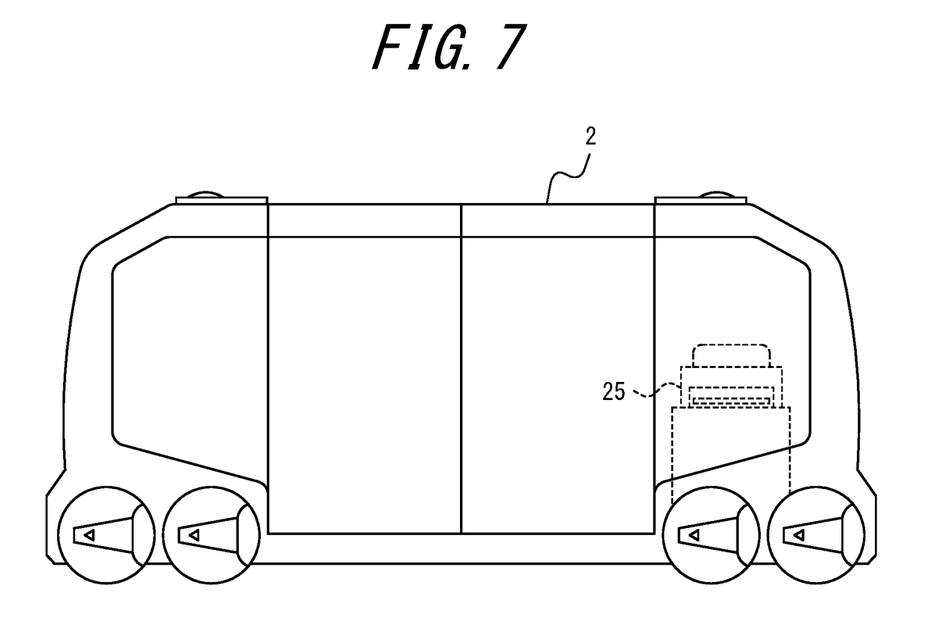
FIG. 7 a diagram illustrating an inside of a vehicle.

The control apparatus 1 controls the vehicle 2 to perform the service content inside the vehicle 2 by the provision time. Here, as illustrated in FIG. 7, the vehicle 2 includes the printer 25. The vehicle 2 receives data of the document from the user through an arbitrary procedure and prints the document using the printer 25.

The control apparatus 1 further controls the vehicle 2 to move to the provision location by the provision time.

The vehicle 2 arrives at the provision location by the provision time, carrying the printed document. The vehicle 2 notifies the arrival with the printed document to the user, using voice or using a screen display on the display 24. Alternatively, the control apparatus 1 may inform the user terminal 3 that the vehicle 2 has arrived, carrying the printed document. The user receives a document from the vehicle 2. The user can obtain the document, without needing to return to pick up the document the user forgot.

Figure 8:
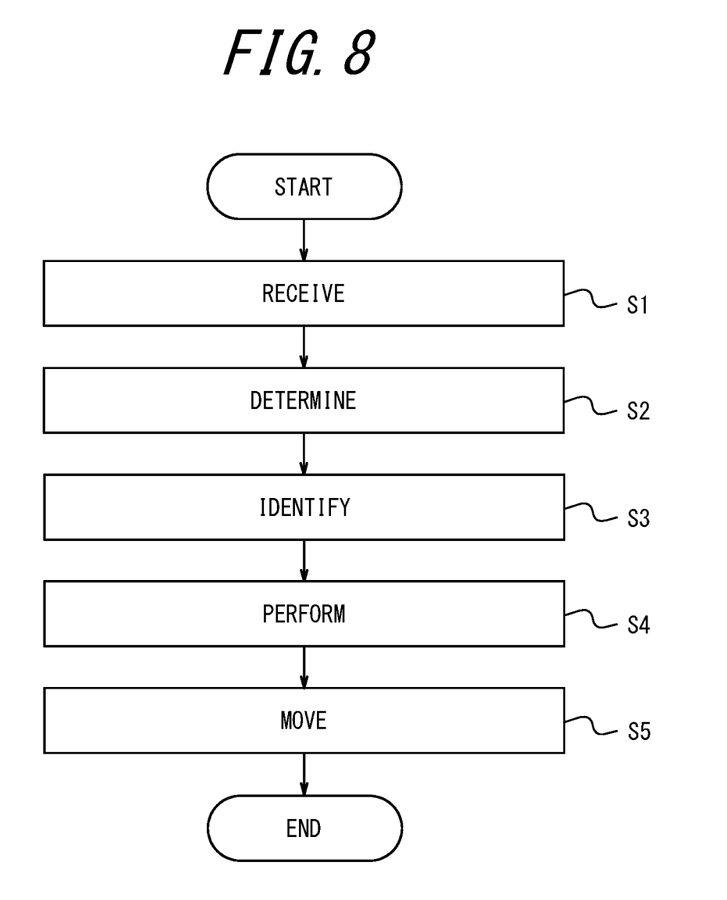
FIG. 8 is a flowchart illustrating operations of the control apparatus.

With reference to FIG. 8, a control method by the control apparatus 1 will be described.

In Step S1, the control apparatus 1 receives a service request from the user terminal 3. By way of example, the service request may include at least information on the service content, the provision time, and the provision location.

In Step S2, the control apparatus 1 determines the service content, the provision time, and the provision location, based on the service request.

In Step S3, the control apparatus 1 identifies a vehicle 2 capable of performing the service content.

In Step S4, the control apparatus 1 controls the vehicle 2 to perform the service content inside the vehicle 2 by the provision time.

In Step S5, the control apparatus 1 controls the vehicle 2 to move to the provision location by the provision time. The order of executing Steps S4 and S5 may be reversed.

As described above, according to the present embodiment, a control apparatus 1 identifies a vehicle 2 capable of performing service content, and controls the vehicle 2 to perform the service content inside the vehicle 2 by a provision time. Further, the control apparatus 1 controls the vehicle 2 to move to a provision location by the providing time. This configuration, the control apparatus 1 can cause the vehicle 2 to perform the service content requested by the user, on behalf of the user. In this manner, the control apparatus 1 can reduce a workload to be imposed on the user and a moving load or the like to be generated when the user returns to pick up things that the user forgot, to thereby improve convenience.

According to the present embodiment, the service content includes creating an article inside the vehicle 2 according to the destination of the user. This configuration enables the control apparatus 1 to determine an article to be needed by the user and create the article, to thereby further reduce the workload and the moving load to be imposed on the user.

According to the present embodiment, the service content includes creating an article inside the vehicle 2 according to the destination and the need of the user. This configuration enables the control apparatus 1 to further accurately determine an article to be needed by the user and create the article, to thereby reduce the workload and the moving load to be imposed on the user.

According to the present embodiment, the vehicle 2 includes a 3D printer. The control apparatus 1 controls the vehicle 2 to perform the service content by using the 3D printer. This configuration enables the control apparatus 1 to create a three-dimensional article, to thereby further reduce the workload and the moving load to be imposed on the user.

While the present disclosure has been described with reference to the drawings and examples, it should be noted that various modifications and revisions can be implemented by those skilled in the art based on the present disclosure. Accordingly, such modifications and revisions are included within the scope of the present disclosure. For example, functions or the like included in each each step can be rearranged without logical inconsistency, and a plurality of steps can be combined into one or divided.

For example, in the aforementioned embodiment, a program that executes all or some of the functions or processing of the control apparatus 1 can be recorded on a computer readable recording medium. The computer readable recording medium includes a non-transitory computer readable medium, and may be a magnetic recording device, an optical disc, a magneto-optical recording medium, or a semiconductor memory. The distribution of the program is performed by, for example, sale, transfer, or rental of a portable recording medium such as a Digital Versatile Disc (DVD) or a Compact Disc Read Only Memory (CD-ROM) on which the program is recorded. The program may also be distributed by storing the program in a storage of any server and transmitting the program from any server to another computer. The program may also be provided as a program product. The present disclosure can also be realized as a program that can be executed by a processor.

In the aforementioned example, the user terminal 3 transmits a service request including information on the service content, the provision time, and the provision location to the control apparatus 1. The control apparatus 1 determines the service content, the provision time, and the provision location, based on the service information. Alternatively, however, the user terminal 3 transmits a service request that does not include information on the service content, the provision time, and the provision location, to the control apparatus 1. Upon receiving the service request, the control apparatus 1 reads the information on the destination, the need, and the time slot stored in association with the user ID, from the schedule DB (see FIG. 9) in the memory 13. The destination is a place that the user is to visit. The need is an activity that the user needs to do at the destination. The time slot is a time slot during which the user stays at the destination. The control apparatus 1 may determine the service content, the provision time, and the provision location, based on the information read from the schedule DB.

Figure 9:
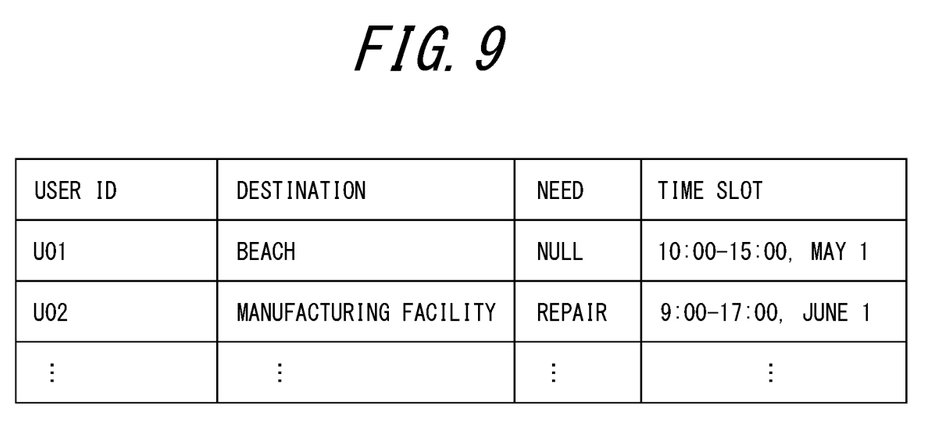
FIG. 9 is a diagram illustrating a data structure of a schedule DB.

For example, as a first alternative example, the control apparatus 1 identifies, for the user U01, that the destination is a beach. Based on the result of identification, the control apparatus 1 uses machine learning or the like, to determine that a pair of sunglasses is the article according to the destination. Alternatively, the control apparatus 1 may determine an article by referring to a storage device in which the destination and the article are stored in association with each other.

Upon determining that a pair of sunglasses is the article according to the destination, the control apparatus 1 determines that the service content is creation of a pair of sunglasses. The printer 25 may be a 3D printer. The vehicle 2 creates a pair of sunglasses using the 3D printer. Any manufacturing device may be used instead of the 3D printer. Upon identifying that the time slot is 10:00 to 15:00 on May 1, the control apparatus 1 determines that the provision time is 10:00 on May 1. When the control apparatus 1 identifies that the destination is a beach, the control apparatus 1 determines that the provision location is the beach. Subsequent processing is the same as in the aforementioned example, and therefore a description thereof is omitted here.

As a second alternative example, the control apparatus 1 identifies, for the user U02 of FIG. 9, that the destination is a manufacturing facility and that the need is a repair. Based on the result of identification, the control apparatus 1 uses machine learning or the like to determine that a specific component to be used in the manufacturing facility is the article according to the destination. Upon determining that a specific component is the article according to the destination, the control apparatus 1 determines that the service content is creation of the specific component. The method of determining the provision time and the provision location in the second alternative example is the same as the method in the aforementioned first alternative example. Therefore, a description thereof is omitted here. The vehicle 2 creates the component using the 3D printer. Subsequent processing is the same as in the aforementioned examples, and therefore a description thereof is omitted here.

The invention claimed is:

1. A control apparatus that is communicably connected to a vehicle and a user terminal, the control apparatus comprising:
   a memory that includes a request database and a schedule database; and
   a controller configured to:
   in response to a service request from the user terminal, determine at least a service content, a provision time, and a provision location;
   identify a vehicle capable of performing the service content;
   cause the vehicle to perform the service content inside the vehicle by the provision time;
   cause the vehicle to move to the provision location by the provision time;
   read, in response to the service request, information on a destination and a time slot during which a user of the user terminal stays at the destination and a need which is an activity that the user needs to do at the destination stored in association with the user in the schedule database;
   determine an article according to the destination based on the information on the destination and the need of the user by using machine learning;
   determine the service content based on the article;
   determine the provision time based on the time slot;
   determine that the provision location is the destination;
   store service information in the request database in response to receiving the service request; and
   determine each content of the service information based on the request database.

2. The control apparatus according to claim 1, wherein the service content includes creating the article inside the vehicle according to the destination of the user.

3. The control apparatus according to claim 2, wherein the destination includes a beach and the article includes a pair of sunglasses.

4. The control apparatus according to claim 1, wherein the service content includes creating the article inside the vehicle according to the destination and the need of the user.

5. The controller according to claim 4, wherein the destination includes a manufacturing facility, the need includes a repair, and the article includes a specific component to be used in the manufacturing facility.

6. The control apparatus according to claim 1, wherein the vehicle includes a 3D printer, and the controller is configured to cause the vehicle to perform the service content using the 3D printer.

7. A vehicle having the control apparatus according to claim 1 mounted therein.

8. The control apparatus according to claim 1, wherein the memory further comprises a vehicle database that is configured to identify the vehicle capable of performing the service content including printing of a document that corresponds to service content input by the user terminal.

9. A non-transitory computer readable medium storing a program configured to cause a computer as a control apparatus that is communicably connected to a vehicle and a user terminal, to execute operations comprising:
   in response to a service request from the user terminal, determining at least a service content, a provision time, and a provision location;
   identifying a vehicle capable of performing the service content;
   causing the vehicle to perform the service content inside the vehicle by the provision time;
   causing the vehicle to move to the provision location by the provision time;
   reading, in response to the service request, information on a destination and a time slot during which a user of the user terminal stays at the destination and a need which is an activity that the user needs to do at the destination stored in association with the user in a schedule database;
   determining an article according to the destination based on the information on the destination and the need of the user by using machine learning;
   determining the service content based on the article;
   determining the provision time based on the time slot;
   determining that the provision location is the destination;
   storing service information in a request database in response to receiving the service request; and
   determining each content of the service information based on the request database.

10. The non-transitory computer readable medium according to claim 9, wherein the service content includes creating the article inside the vehicle according to the destination of the user.

11. The non-transitory computer readable medium according to claim 10, wherein the destination includes a beach and the article includes a pair of sunglasses.

12. The non-transitory computer readable medium according to claim 9, wherein the service content includes creating the article inside the vehicle according to the destination and the need of the user.

13. The non-transitory computer readable medium according to claim 12, wherein the destination includes a manufacturing facility, the need includes a repair, and the article includes a specific component to be used in the manufacturing facility.

14. A control method by a control apparatus that is communicably connected to a vehicle and a user terminal, the control method comprising:
   in response to a service request from the user terminal, determining at least a service content, a provision time, and a provision location;
   identifying a vehicle capable of performing the service content;
   causing the vehicle to perform the service content inside the vehicle by the provision time;
   causing the vehicle to move to the provision location by the provision time;
   reading, in response to the service request, information on a destination and a time slot during which a user of the user terminal stays at the destination and a need which is an activity that the user needs to do at the destination stored in association with the user in a schedule database;
   determining an article according to the destination based on the information on the destination and the need of the user by using machine learning;
   determining the service content based on the article;
   determining the provision time based on the time slot;
   determining that the provision location is the destination;
   storing service information in a request database in response to receiving the service request; and
   determining each content of the service information based on the request database.

15. The control method according to claim 14, wherein the service content includes creating the article inside the vehicle according to the destination of the user.

16. The control method according to claim 15, wherein the destination includes a beach and the article includes a pair of sunglasses.

17. The control method according to claim 14, wherein the service content includes creating the article inside the vehicle according to the destination and the need of the user.

18. The control method according to claim 17, wherein the destination includes a manufacturing facility, the need includes a repair, and the article includes a specific component to be used in the manufacturing facility.

* * * * *